US009141661B2

(12) United States Patent
Satoh

(10) Patent No.: US 9,141,661 B2
(45) Date of Patent: Sep. 22, 2015

(54) REPORT CREATING SYSTEM, REPORT CREATING APPARATUS, AND REPORT CREATING METHOD

(71) Applicant: Jun Satoh, Tokyo (JP)

(72) Inventor: Jun Satoh, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 225 days.

(21) Appl. No.: 13/771,476

(22) Filed: Feb. 20, 2013

(65) Prior Publication Data

US 2013/0218920 A1 Aug. 22, 2013

(30) Foreign Application Priority Data

Feb. 21, 2012 (JP) ................................. 2012-034806

(51) Int. Cl.
*G06F 17/30* (2006.01)
*G06Q 10/00* (2012.01)

(52) U.S. Cl.
CPC .......... *G06F 17/30386* (2013.01); *G06Q 10/00* (2013.01)

(58) Field of Classification Search
CPC ................................................ G06F 17/30283
See application file for complete search history.

(56) References Cited

U.S. PATENT DOCUMENTS

| 5,583,615 | A | * | 12/1996 | Hashimoto et al. ............... 399/8 |
| 6,430,711 | B1 | * | 8/2002 | Sekizawa ..................... 714/47.2 |
| 6,970,952 | B2 | * | 11/2005 | Motoyama ....................... 710/15 |
| 2001/0028473 | A1 | * | 10/2001 | Yamasaki et al. ............ 358/1.15 |
| 2002/0087350 | A1 | | 7/2002 | Miida et al. |
| 2004/0049552 | A1 | * | 3/2004 | Motoyama et al. ........... 709/208 |

FOREIGN PATENT DOCUMENTS

| JP | 2002-269293 | 9/2002 |
| JP | 4163550 | 10/2008 |

\* cited by examiner

*Primary Examiner* — Khanh Pham
(74) *Attorney, Agent, or Firm* — IPUSA, PLLC

(57) ABSTRACT

A report creating system includes a storage part storing machine type information correlating the machine type codes of apparatuses with corresponding types of the apparatuses, pattern information showing usage patterns based on the presence or absence of usage of the types of the apparatuses, and type information correlating the usage patterns with corresponding report types; an identification part obtaining the machine type code of one or more of the apparatuses remotely managed by a remote management system and identifying the type of the one or more of the apparatuses based on the machine type code and the machine type information; a first determination part determining the usage pattern based on the identified type and the pattern information; a second determination part determining the report type based on the determined usage pattern and the type information; and a creation part creating a report based on the determined report type.

22 Claims, 18 Drawing Sheets

FIG.9

| CUSTOMER CODE | MACHINE TYPE AND NUMBER INFORMATION |
|---|---|
| 456001 | A284, 111111 |
| 456001 | B236, 111111 |
| 456001 | A501, 111111 |
| ... | ... |
| 456002 | A284, 222222 |
| ... | ... |

FIG.10

| MACHINE TYPE CODE | MACHINE TYPE NAME | TYPE |
|---|---|---|
| A284 | MP C4500 | MFP |
| ... | ... | ... |
| B236 | MP C6000 | MFP |
| ... | ... | ... |
| A501 | PJ 320 | PROJECTOR |
| ... | ... | ... |

FIG.11

| USAGE PATTERN | PRESENCE OR ABSENCE OF USAGE OF MFP | PRESENCE OR ABSENCE OF USAGE OF PROJECTOR |
|---|---|---|
| 101 | × | ○ |
| 102 | ○ | × |
| 103 | ○ | ○ |
| ... | ... | ... |

FIG.12A

| USAGE PATTERN | REPORT TYPE |
|---|---|
| 101 | TYPE A |
| 102 | TYPE B |
| 103 | TYPE C |
| ... | ... |

FIG.12B

| USAGE PATTERN | REPORT TYPE |
|---|---|
| 101 | TYPE A, D, E |
| 102 | TYPE B, F |
| 103 | TYPE C |
| ... | ... |

FIG.13

SELECT REPORT TYPE

☐ TYPE A    DETAILS

☐ TYPE D    DETAILS

☐ TYPE E    DETAILS

| OK | RETURN |

FIG.14

| | | MP C4500 | MP C4500 | MP C6000 | MP C6000 |
|---|---|---|---|---|---|
| MACHINE TYPE NAME | | MP C4500 | MP C4500 | MP C6000 | MP C6000 |
| MACHINE NUMBER | | 444444 | 555555 | 666666 | 123456 |
| INSTALLATION SECTION NAME | | HEADQUARTERS N<sup>TH</sup> FLOOR | HEADQUARTERS N<sup>TH</sup> FLOOR | HEADQUARTERS N<sup>TH</sup> FLOOR | HEADQUARTERS N<sup>TH</sup> FLOOR |
| DATA OBTAINING DATE AND TIME | | JAN. 31 | JAN. 31 | JAN. 31 | JAN. 31 |
| TOTAL OUTPUT NUMBER | | 1,582 | 15,278 | 17,731 | 3,109 |
| DUPLEX | DUPLEX OUTPUT IMAGE NUMBER | 182 | 4,896 | 4,437 | 745 |
| | DUPLEX USAGE RATE | 11.5% | 32.0% | 25.0% | 24.0% |
| | 1 SIDED → 2 SIDED (SIDE NUMBER) | 78 | 2,848 | 3,693 | 391 |
| | BOOK → 2 SIDED (SIDE NUMBER) | 0 | 0 | 0 | 0 |
| | 2 SIDED → 2 SIDED (SIDE NUMBER) | 104 | 2,050 | 744 | 354 |
| COMBINE | COMBINE 1 SIDE (SIDE NUMBER) | 77 | 1,491 | 2,148 | 307 |
| | COMBINE 2 SIDES (SIDE NUMBER) | 86 | 2,317 | 3,137 | 961 |
| | COMBINE BOOKLET (SIDE NUMBER) | 0 | 0 | 0 | 0 |
| | COMBINE MAGAZINE (SIDE NUMBER) | 28 | 0 | 0 | 0 |
| | COMBINE (SHEET NUMBER) | — | — | — | — |
| | COMBINE 2 in 1 (SIDE NUMBER) | 158 | 3,240 | 5,281 | 1,176 |
| | COMBINE 4 in 1 (SIDE NUMBER) | 5 | 568 | 0 | 92 |
| | COMBINE 6 in 1 (SIDE NUMBER) | 0 | 0 | 0 | 0 |
| | COMBINE 8 in 1 (SIDE NUMBER) | 0 | 0 | 0 | 0 |
| | COMBINE 9 in 1 (SIDE NUMBER) | 0 | 0 | 0 | 0 |
| | COMBINE 16 in 1 (SIDE NUMBER) | 0 | 0 | 0 | 0 |

FIG.15

| MACHINE TYPE NAME | | MP C4500 | MP C4500 | MP C6000 | MP C6000 |
|---|---|---|---|---|---|
| MACHINE NUMBER | | 444444 | 555555 | 666666 | 123456 |
| INSTALLATION SECTION NAME | | HEADQUARTERS N$^{TH}$ FLOOR | HEADQUARTERS N$^{TH}$ FLOOR | HEADQUARTERS N$^{TH}$ FLOOR | HEADQUARTERS N$^{TH}$ FLOOR |
| DATA OBTAINING DATE AND TIME | | JAN. 31 | JAN. 31 | JAN. 31 | JAN. 31 |
| OUTPUT BY COLOR MODE | BLACK & WHITE | 980 | 9,278 | 10,701 | 2,251 |
| | SINGLE-COLOR | 30 | 320 | 400 | 78 |
| | TWO-COLOR | 52 | 480 | 600 | 20 |
| | FULL COLOR | 520 | 5,200 | 6,030 | 760 |

FIG.16

| MACHINE TYPE NAME | | MP C4500 | MP C4500 | MP C6000 | MP C6000 |
|---|---|---|---|---|---|
| MACHINE NUMBER | | 444444 | 555555 | 666666 | 123456 |
| INSTALLATION SECTION NAME | | HEADQUARTERS N$^{TH}$ FLOOR | HEADQUARTERS N$^{TH}$ FLOOR | HEADQUARTERS N$^{TH}$ FLOOR | HEADQUARTERS N$^{TH}$ FLOOR |
| DATA OBTAINING DATE AND TIME | | JAN. 31 | JAN. 31 | JAN. 31 | JAN. 31 |
| TIME BY OPERATING CONDITION (MINUTES) | OPERATING TIME | 186 | 1,226 | 1,379 | 364 |
| | NORMAL WAIT TIME | 298 | 1,293 | 1,289 | 4,130 |
| | PREHEATING MODE TIME | 3,408 | 7,740 | 7,777 | 0 |
| | SLEEP MODE TIME | 37,674 | 2,734 | 5,197 | 5,250 |
| | OFF MODE TIME | 0 | 25,863 | 23,225 | 19,343 |

FIG.17

| MACHINE TYPE NAME | PJ 320 | PJ 400 |
|---|---|---|
| MACHINE NUMBER | 333333 | 999999 |
| DATA OBTAINING DATE AND TIME | JAN. 31 | JAN. 31 |
| PROJECTION TIME | 120 MIN. | 35 MIN. |
| MODE ECO MODE | 110 MIN. | – |
| NORMAL MODE | 10 MIN. | 35 MIN. |

FIG.18

| MACHINE TYPE NAME | MP C4500 | | PJ 320 | |
|---|---|---|---|---|
| TOTAL OUTPUT NUMBER | JAN. | 2732 | PROJECTION TIME JAN. | 231 MIN. |
| | FEB. | 4981 | FEB. | 116 MIN. |
| | MAR. | 1836 | MAR. | 382 MIN. |
| | APR. | 5277 | APR. | 51 MIN. |
| | ... | ... | ... | ... |

REPORT CREATING SYSTEM, REPORT CREATING APPARATUS, AND REPORT CREATING METHOD

CROSS-REFERENCE TO RELATED APPLICATION

The present application is based upon and claims the benefit of priority of Japanese Patent Application No. 2012-034806, filed on Feb. 21, 2012, the entire contents of which are incorporated herein by reference.

BACKGROUND OF THE INVENTION

1. Field of the Invention

The present invention relates to a report creating system, a report creating apparatus, and a report creating method for creating a report.

2. Description of the Related Art

There has been a recent demand for solving problems such as an increase in document-related cost or assets and an increase in environmental loads by optimizing apparatus environment and reviewing managerial and operational work. For example, by using a system for remotely managing apparatuses connected to a network, it is possible to determine the conditions of the apparatuses in real time in a management center.

Various services are provided in this remote management system. For example, Japanese Patent No. 4163550 describes a remote management system where a management apparatus manages apparatuses through an intermediary apparatus.

Further, for example, Japanese Laid-Open Patent Application No. 2002-269293 describes obtaining necessary information from the database of a management apparatus in accordance with the contents of a user's request and creating a report as a service provided by a remote management system.

Here, one of the services provided based on the information collected by the management apparatus of the remote management system is a service called a "usage report service." This service provides a report on the usage of managed apparatuses on an apparatus basis when the managed apparatuses are apparatuses having a printing function, such as image forming apparatuses. The details of the usage to be reported are, for example, as follows:

the rates of usage of a duplex (printing or copying) function and a combining function and the number of outputs by paper size on for each apparatus;

a paper reduction effect due to the use of a duplex function and a combining function (an estimated value);

power consumption and the $CO_2$ emissions (output) of an apparatus at the time of its use on an apparatus basis (estimated values); and the total paper reduction of an apparatus expressed with the transition of the total number of outputs over the last twelve months on an apparatus basis.

Meanwhile, according to conventional techniques, image forming apparatuses are considered as managed apparatuses in the case of providing reports, so that other apparatuses are not under remote management. Therefore, in the case of managing other apparatuses such as a projector, the remote management system is desired to create a report that covers usage of the other apparatuses.

SUMMARY OF THE INVENTION

According to an aspect of the present invention, a report creating system includes a storage part configured to store machine type information, pattern information, and type information, wherein the machine type information correlates machine type codes of apparatuses with corresponding types of the apparatuses, the pattern information shows usage patterns based on presence or absence of usage of the types of the apparatuses, and the type information correlates the usage patterns with corresponding report types; an identification part configured to obtain the machine type code of one or more of the apparatuses remotely managed by a remote management system, and to identify the type of the one or more of the apparatuses based on the machine type code and the machine type information; a first determination part configured to determine the usage pattern based on the type identified by the identification part and the pattern information; a second determination part configured to determine the report type based on the usage pattern determined by the first determination part and the type information; and a creation part configured to create a report based on the report type determined by the second determination part.

According to an aspect of the present invention, a report creating apparatus connected via a network to a remote management system remotely managing one or more apparatuses includes an obtaining part configured to obtain first identification information for identifying a type of the one or more apparatuses; and a creation part configured to create a report according to the type of the one or more apparatuses determined based on the obtained identification information.

According to an aspect of the present invention, a report creating method includes the steps of obtaining a machine type code of one or more apparatuses remotely managed by a remote management system, and identifying a type of the one or more apparatuses based on the machine type code and machine type information correlating the machine type code with a corresponding type of the one or more apparatuses; determining a usage pattern based on the identified type of the one or more apparatuses and pattern information showing the usage pattern based on presence or absence of usage of the type of the one or more apparatuses; determining a report type based on the determined usage pattern and type information correlating the usage pattern with a corresponding one or more report types; and creating a report based on the determined report type, wherein the steps are executed by a computer.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 9 is a diagram illustrating device information managed in a database of the remote management system according to an embodiment;

FIG. 10 is a diagram illustrating machine type information managed in a database of the report creating system according to an embodiment;

FIG. 11 is a diagram illustrating pattern information stored in the database of the report creating system according to an embodiment;

FIG. 12A is a diagram illustrating an example of type information managed in the database of the report creating system according to an embodiment;

FIG. 12B is a diagram illustrating another example of type information managed in the database of the report creating system according to an embodiment;

FIG. 13 is a diagram illustrating a report type selecting screen according to an embodiment;

FIG. 14 is a diagram illustrating a report based on a report type for reporting the usage of a duplex function and a combining function according to an embodiment;

FIG. 15 is a diagram illustrating a report based on a report type for reporting output on a color mode basis according to an embodiment;

FIG. 16 is a diagram illustrating a report based on a report type for reporting time by operating condition according to an embodiment;

FIG. 17 is a diagram illustrating a report based on a report type for reporting the mode-by-mode projection time of a projector according to an embodiment;

FIG. 18 is a diagram illustrating a report based on a report type for reporting the usage of an MFP and the projector according to an embodiment;

DETAILED DESCRIPTION OF THE PREFERRED EMBODIMENTS

As described above, in the case of managing other apparatuses such as a projector, the remote management system is desired to create a report that covers usage of the other apparatuses.

However, image forming apparatuses and other apparatuses use different devices and process different data, and the remote management system is not provided with information on which one of the other apparatuses has been used. Therefore, it is impossible for the remote management system to determine what type of report to create. Therefore, the remote management system is prevented from creating an appropriate report in the case of managing various kinds (types) of apparatuses.

According to an aspect of the present invention, a report creating system, a report creating apparatus, and a report creating method are provided that create an appropriate report when various kinds (types) of apparatuses are managed by a remote management system.

According to an aspect of the present invention, an appropriate report is created when various kinds (types) of apparatuses are managed by a remote management system.

A description is given below, with reference to the accompanying drawings, of one or more embodiments of the present invention.

Figure 1:
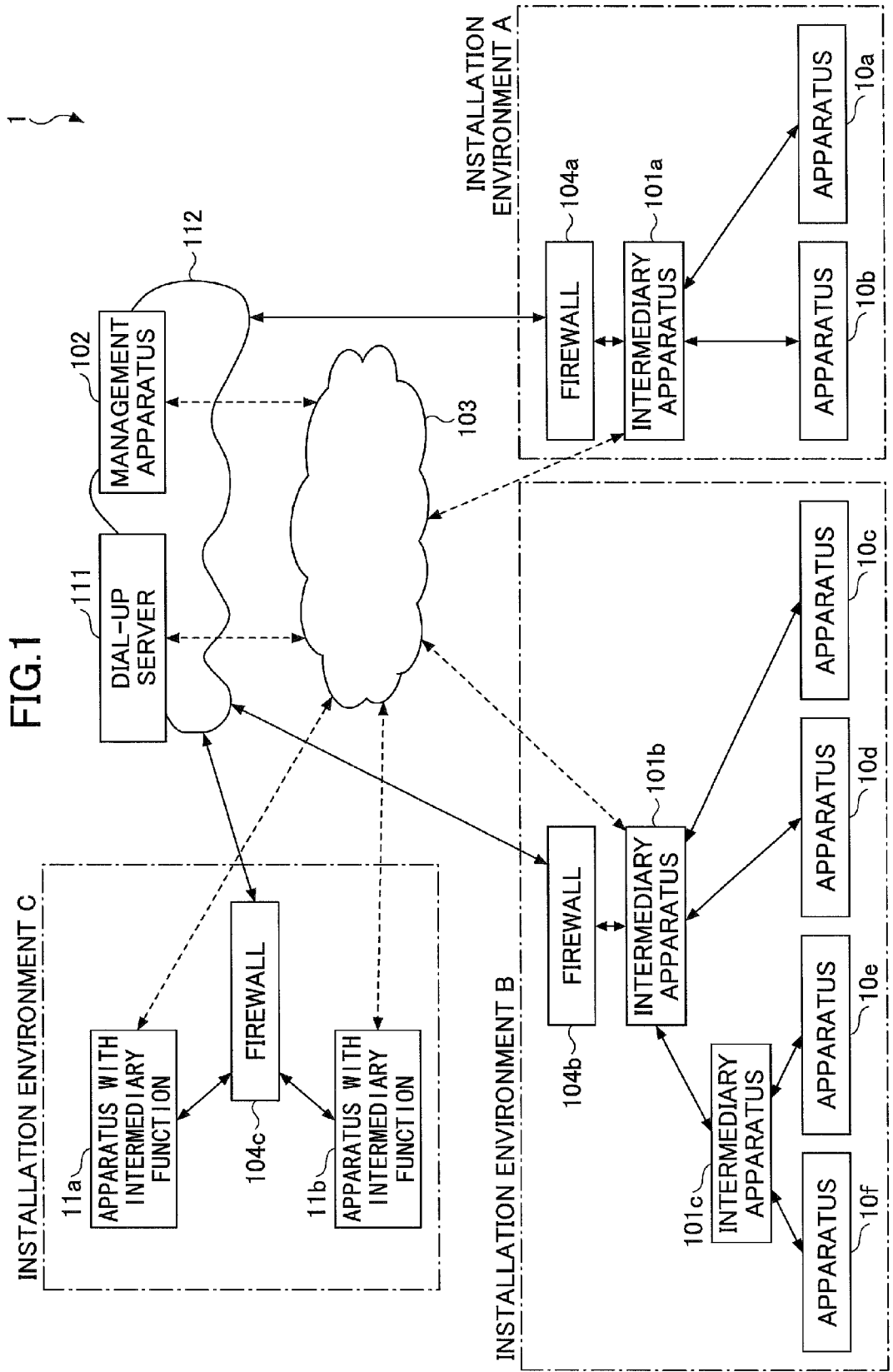
FIG. 1 is a diagram illustrating a configuration of a remote management system according to an embodiment.

First, a description is given of a remote management system on which certain embodiments of the present invention are based. FIG. 1 is a diagram illustrating a configuration of a remote management system 1 according to an embodiment.

The remote management system 1 manages apparatuses 10a, 10b, 10c, 10d, 10e, and 10f, which are objects to be managed. The apparatuses 10a through 10f may also be collectively referred to as the "apparatus or apparatuses 10." Examples of the apparatuses 10 include image forming apparatuses such as printers, facsimile (FAX) machines, digital copiers, scanners, and digital multifunction machines; network consumer electronics; vending machines; medical devices; power supply units; air conditioning systems; and electronic apparatuses (communications devices), which are metering systems for gas, water, electricity, etc., with a communicating function.

The apparatuses 10 may be connected via a local area network (LAN) to apparatuses including intermediary apparatuses 101a, 101b, and 101c, which may also be collectively referred to as the "intermediary apparatus or apparatuses 101." The intermediary apparatuses 101 may be connected to a management apparatus 102, which operates as a server, via a public line (a telephone line) 103 or the Internet 112.

The management apparatus 102 may remotely perform centralized management (control) of the apparatuses 10 via the intermediary apparatuses 101. Examples of the public line 103 include landlines such as an analog line, an ADSL line, a digital line (an ISDN line), and an optical fiber line; and mobile phone lines such as a cellular phone line and a PHS line.

In an installation environment A illustrated in FIG. 1, a simple hierarchical structure is constructed where the intermediary apparatus 101a, which is capable of establishing a direct connection with the management apparatus 102 based on Hypertext Transfer Protocol (HTTP), has the apparatuses 10a and 10b as subordinates.

Further, in an installation environment B illustrated in FIG. 1, because four apparatuses 10 are installed, installation of a single intermediary apparatus 101 alone would result in a high operational load on the installed intermediary apparatus 101. Therefore, the intermediary apparatus 101b, which is capable of establishing a direct connection with the management apparatus 102 based on HTTP, has not only the apparatuses 10c and 10d but also the intermediary apparatus 101c as subordinates.

The intermediary apparatus 101c forms a hierarchical structure where the intermediary apparatus 101c also has the apparatuses 10e and 10f as subordinates. In this case, in order to remotely manage the apparatuses 10e and 10f, information transmitted from the management apparatus 102 reaches the apparatus 10e or 10f via the intermediary apparatus 101b and its subordinate node of the intermediary apparatus 101c.

Further, apparatuses, which are objects of management, may also have the functions of the intermediary apparatuses 101. These apparatuses are referred to as "apparatuses with an intermediary function" or simply referred to as "apparatuses." As in an installation environment C illustrated in FIG. 1, apparatuses with an intermediary function 11a and 11b, which may be collectively referred to as the "apparatus or apparatuses (with an intermediary function) 11," may be connected to the management apparatus 102 via the public line 103 or the Internet 112 without going through (without intervention of) an intermediary apparatus.

Although not graphically illustrated, apparatuses equal to the apparatuses 10 may also be connected to the apparatuses with an intermediary function 11 as the subordinates of the apparatuses 11.

A dial-up server 111, which is a relay, connects the management apparatus 102 and the intermediary apparatuses 101 or the apparatuses 11 via the public line 103 (which may be a dedicated line) and the Internet 112, so as to enable communications between the management apparatus 102 and the intermediary apparatuses 101 or the apparatuses 11.

For example, in response to a request (for communications with the management apparatus 102) from the intermediary apparatus 101 or the apparatus 11, the dial-up server 111 performs negotiations (communication-related information exchange) with the requestor via the public line 103.

As a result of the negotiations, the dial-up server 111 connects the requestor and the management apparatus 102 so as to enable communications between the requestor and the management apparatus 102. That is, the dial-up server 111 causes the requestor and the management apparatus 102 to communicate with each other.

In consideration of security, firewalls 104a, 104b, and 104c, which may also be collectively referred to as the "firewall or firewalls 104," are installed in the installation environments A, B, and C, respectively. The firewall 104 is formed of a proxy server.

In the remote management system 1 illustrated in FIG. 1, the intermediary apparatus 101 contains an application program for controlling and managing the apparatus 10 connected to the intermediary apparatus 101.

The management apparatus 102 contains an application program for controlling and managing the intermediary apparatuses 101 and controlling and managing the apparatuses 10 through the intermediary apparatus 101. Each of these nodes including the apparatuses 10 in the remote management system 1 is configured to transmit a "request," which is a request for processing to a method of the application program of another node and to receive a "response," which is the result of the requested processing, based on a remote procedure call (RPC).

That is, the intermediary apparatus 101 or the apparatus 10 connected to the intermediary apparatus 101 is configured to generate and pass a request to the management apparatus 102, and to obtain a response to this request. Further, the management apparatus 102 is configured to generate and pass a request to the intermediary apparatus 101, and to obtain a response to this request.

This request includes causing the intermediary apparatus 101 to transmit various kinds of requests to the apparatus 10 and obtaining a response from the apparatus 10 via the intermediary apparatus 101.

In order to implement an RPC, known protocols (communications standards), techniques, and specifications, such as Simple Object Access Protocol (SOAP), HTTP, File Transfer Protocol (FTP), Component Object Model (COM), and Common Object Request Broker Architecture (CORBA), may be used.

The remote management system 1 as illustrated in FIG. 1 allows information on apparatuses used by customers (the apparatuses 10) to be collected in the management apparatus 102. The management apparatus 102 retains the device (apparatus) information and usage information of the apparatuses used by customers. In the report creating system described next, a report is created using the information collected by the management apparatus 102. Examples of the report include a usage report.

Figure 2:
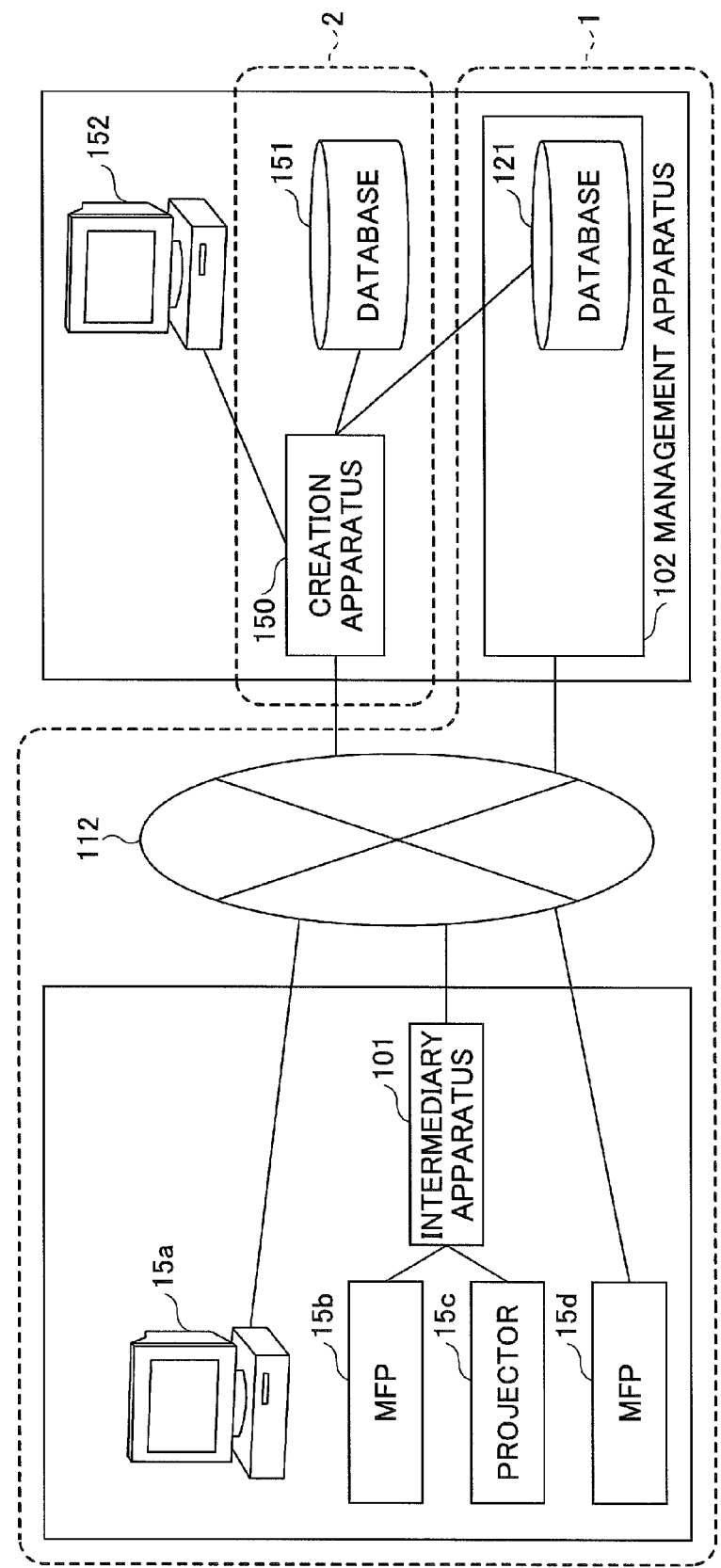
FIG. 2 is a diagram illustrating an arrangement of a report creating system relative to the remote management system according to an embodiment.

Next, a description is given of a report creating system according to an embodiment. FIG. 2 is a diagram illustrating an arrangement of a report creating system 2 relative to the remote management system 1. In the remote management system 1 illustrated in FIG. 2, a multifunction peripheral (MFP) 15b and a projector 15c are managed as the apparatuses 10 via the intermediary apparatus 101, and an MFP 15d is managed as the apparatus with an intermediary function 11.

Conventional object apparatuses of remote management are mostly MFPs, but other apparatuses such as the projector 15c may also be subjected to remote management. In the following description, the projector 15c is taken as an example of the other apparatuses.

The MFPs 15b and 15d and the projector 15c that are apparatuses subjected to remote management inform the management apparatus 102 of machine type and number information and customer codes as device information. The machine type and number information includes a machine type code, which is determined for each of the machine types of apparatuses and is defined and used as a company (in-house) standard, and an identification number (machine number) that differs from apparatus to apparatus to uniquely identify each apparatus. The machine type and number information enables identification of the machine type of a product. The customer code is information for uniquely identifying a customer.

The MFPs 15b and 15d subjected to remote management have a function of transmitting a failure notification, a supply (toner supply) notification, and the total counts of copies and prints to the management apparatus 102 as usage information.

The projector 15c subjected to remote management has a function of transmitting a failure notification and information on projection time to the management apparatus 102 as usage information.

The management apparatus 102 includes a database 121, and stores the received usage information in the database so that the stored usage information may be read out in correlation with the machine type and number information. The management apparatus 102 uses the usage information for management of the conditions of apparatuses and for various services.

The management apparatus 102 uses the machine type and number information of apparatuses as the identification information of apparatuses, and uses the customer codes as the identification information of customers.

The report creating system 2 illustrated in FIG. 2 includes a creation apparatus 150 and a database 151. The creation apparatus 150 is an information processor that creates reports using the device information collected by the management apparatus 102.

The database 151 is a storage part that stores data for creating reports and stores reports created by the creation apparatus 150. The database 151 may alternatively be provided inside the creation apparatus 150.

Customers download reports from the report creating system 2 using an information processor (a personal computer [PC]) 15a or a PC 152.

The report creating system 2 is provided in the same wide area network (WAN) or the like as the remote management system 1. The report creating system 2 is configured to access the database 121 of the remote management system 1 and read necessary data.

The report creating system 2 retains an interface that may be operated via a network, such as an interface that may be controlled by a user of a service operation section in the same WAN.

Further, the report creating system 2 retains, for example, an interface as a members-only portal site accessed via the Internet 112 by customers. Customers are allowed to receive services, for example, download reports, from the report creating system 2 via the Internet 112. Next, a description is given in detail of the apparatuses (the MFPs 15b and 15d and the projector 15c), the management apparatus 102, and the creating apparatus 150.

Figure 3:
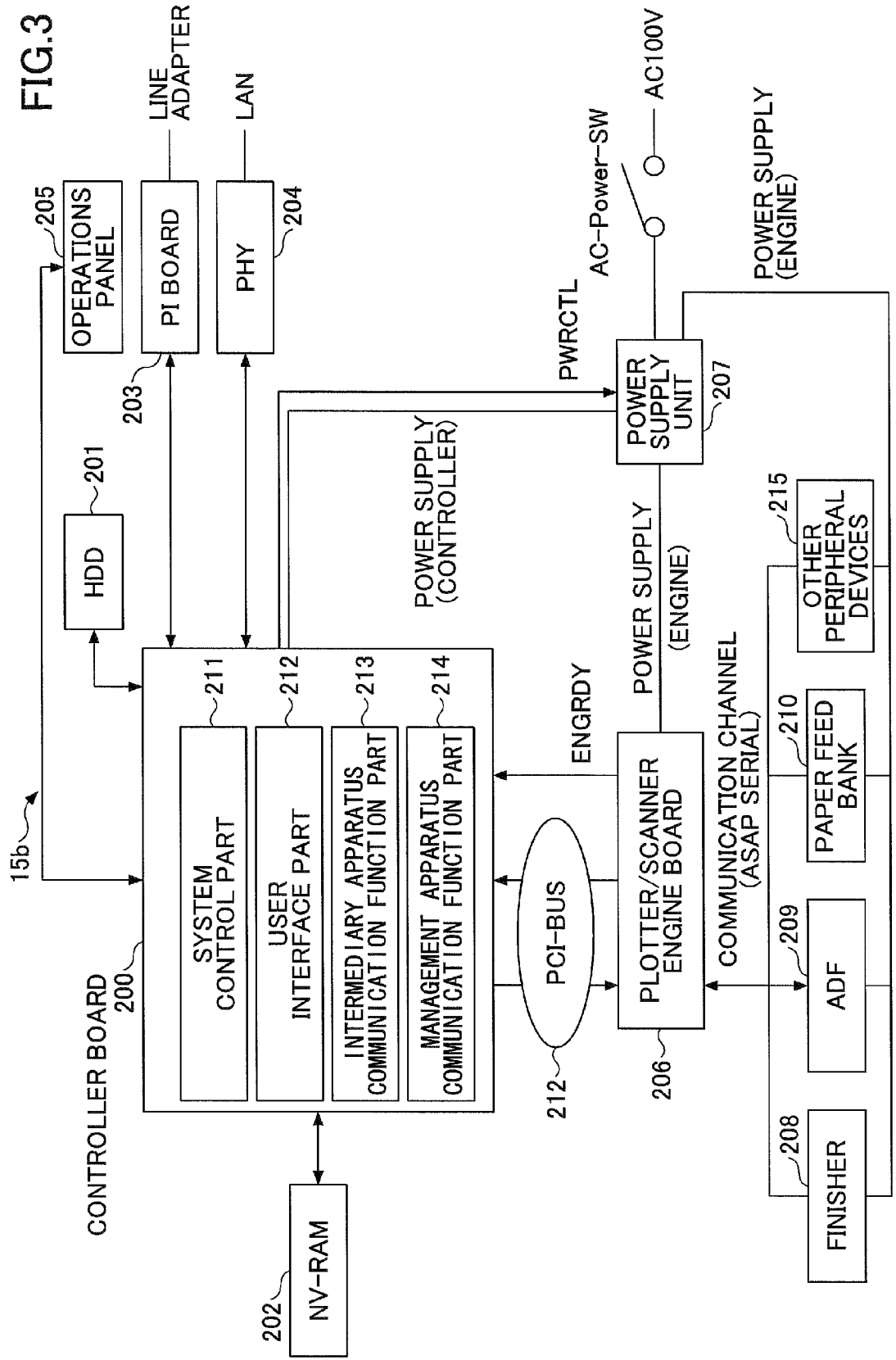
FIG. 3 is a block diagram illustrating a configuration of an MFP according to an embodiment.

First, a description is given of the MFP 15b, which is an example of a remotely managed image forming apparatus. FIG. 3 is a block diagram illustrating a configuration of the MFP 15b. As illustrated in FIG. 3, the MFP 15b includes a controller board 200, a hard disk drive (HDD) 201, a nonvolatile random access memory (NV-RAM) 202, a personal interface (PI) board 203, a physical media interface (PHY) 204, an operations panel 205, a plotter and scanner engine board 206, a power supply unit 207, a finisher 208, an automatic document feeder (ADF) 209, a paper feed bank 210, and other peripheral machines 215. Each of these units is a hardware resource in the MFP 15b.

The controller board 200, which corresponds to a control part, includes a central processing unit (CPU), a read-only memory (ROM), and a RAM, and controls functions via a peripheral component interconnect (PCI) bus 212.

The HDD 201 is a storage part (a recording medium) that stores and retains information irrespective of power supply from the power supply unit 207. The NV-RAM 202 is a nonvolatile storage part, for which a nonvolatile memory may be used, such as a nonvolatile RAM that integrates a RAM and a backup circuit using a battery, an erasable programmable read-only memory (EEPROM), or a flash memory. The RAM inside the controller board 200 is a volatile storage part that stores and retains information only when power is supplied from the power supply unit 207.

The PI board 203 and the PHY 204, which are for external communications, correspond to a communications part, which is, for example, a communications board. The PI board 203, which includes an interface compliant with the RS-485 standard, is connected to the public line 103 (FIG. 1) via a line adapter. The PHY 204 is an interface for performing communications with an external apparatus via a LAN.

The operations panel 205 is an operation unit that includes an operation part including various kinds of operation keys (also referred to as operation switches or operation buttons) and a display part including a liquid crystal display (LCD) or cathode ray tube (CRT) character display device.

Here, ENGRDY illustrated in FIG. 3 is a signal line for notifying the controller board 200 of the completion of various initial settings and readiness for exchanging commands with the controller board 200 on the engine side. Further, PWRCTL illustrated in FIG. 3 is a signal line for the controller board 200 to control power supply to engines.

Next, a description is given of functional parts implemented by the processing of the CPU inside the controller board 200 of the MFP 15b.

The MFP 15b includes an application module layer at the top and a service module layer below the application module layer.

The software of the application module layer is configured of a program for causing the CPU to operate as multiple application control parts that cause hardware resources to operate to implement desired functions.

The software of the service module layer is configured of a program for causing the CPU to operate as a service control part that is interposed between hardware resources and application control parts and controls the execution of the operations of hardware resources based on requests for the operations of hardware resources from application control parts.

The programs that configure the above-described software are stored in the HDD 201 or the RAM of the controller board 200 and are read as required to be executed by the CPU of the controller board 200.

By executing these programs as required, the CPU implements functional parts as illustrated in FIG. 3, that is, a system control part 211, a user interface part 212, an intermediary apparatus communication function part 213, and a management apparatus communication function part 214.

The system control part 211 manages control of the entire MFP 15b, and executes the process of a task execution procedure that executes a communication task using the intermediary apparatus communication function part 213 or the management apparatus communication function part 214.

The system control part 211 executes the process of a power supply control procedure that stops power supply by the power supply unit 207 when the user interface part 212 receives an operation to turn off the apparatus (the MFP 15b) from the operations panel 205.

The system control part 211 requests each of the intermediary apparatus communication function part 213 and the management apparatus communication function part 214 to transmit a message. The intermediary apparatus communication function part 213 and the management apparatus communication function part 214 interpret respective received messages and perform control in accordance with the contents of the received messages.

As a result of execution of this communication task, the machine type and number information, the customer information (customer codes), and the information showing usage (usage information) of the MFP 15b are transmitted to the management apparatus 102. The usage information of the MFP 15b includes, for example, the following information:

the rates of usage of a duplex (printing or copying) function and a combining function and the number of outputs by paper size on an apparatus basis;

a paper reduction effect due to the use of a duplex function and a combining function (an estimated value); and power consumption and the $CO_2$ emissions (output) of an apparatus at the time of its use on an apparatus basis (estimated values).

Figure 4:
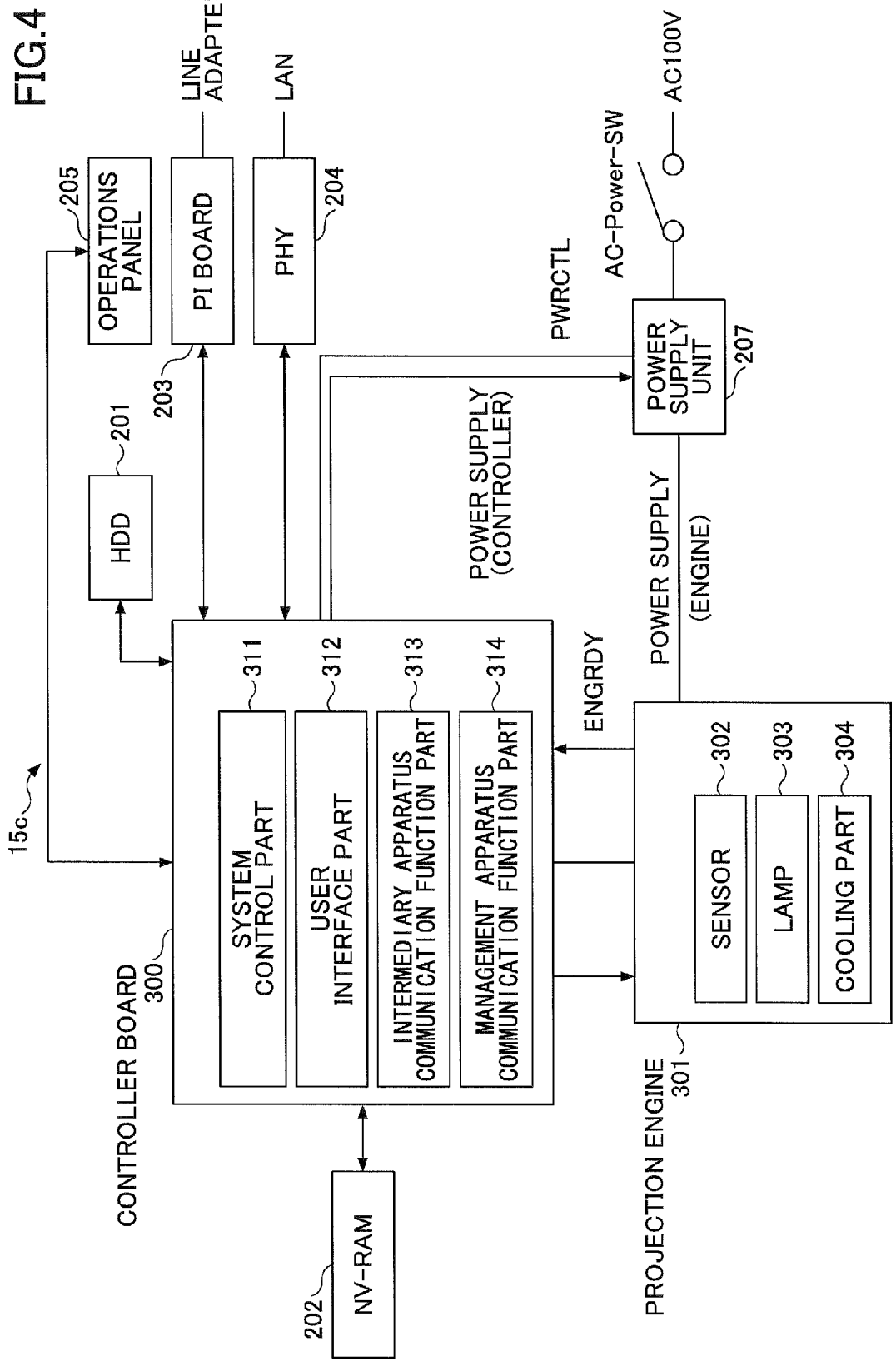
FIG. 4 is a block diagram illustrating a configuration of a projector according to an embodiment.

Next, a description is given of the projector 15c subjected to remote management. FIG. 4 is a block diagram illustrating a configuration of the projector 15c. Of the units (components) of the projector 15c illustrated in FIG. 4, the units other than a controller board 300 and a projection engine 301 are the same as the units (components) of the MFP 15b illustrated in FIG. 3. Therefore, the same units as those of FIG. 3 are referred to by the same reference numerals, and their descriptions are omitted.

The controller board 300 illustrated in FIG. 4, which corresponds to a control part, includes a microcomputer including a CPU, a ROM, and a RAM, and controls the operations of other units via a PCI bus.

Here, ENGRDY in FIG. 4 is a signal line for notifying the controller board 300 of the completion of various initial settings and readiness for exchanging commands with the controller board 300 on the projection engine 301 side.

Further, PWRCTL in FIG. 4 is a signal line for the controller board 300 to control the power supply of the power supply unit 207 to the projection engine 301.

The projection engine 301 includes a sensor 302, a lamp 303, and a cooling part 304. The lamp 303 is a light source that emits light for projecting a magnified image onto a screen as a projection surface and displaying the magnified image on the screen.

The sensor 202 includes a sensor that detects the temperature of the lamp 303, a sensor that detects the operating time of the lamp 303, and a sensor that detects predetermined events inside the projection engine 301, such as abnormalities (for example, a lamp abnormality, a cooling fan abnormality, etc.).

The cooling part 304 is a device that cools the lamp 303 whose temperature has become high. Examples of the cooling part 304 include a cooling fan that cools the lamp 303 by blowing air to the lamp 303 and a cooling device that has a Peltier element provided in contact with the lamp 303 and cools the lamp 303 by a cooling effect caused by causing electric current to flow through the Peltier element.

Next, a description is given of functional parts implemented by the processing of the CPU inside the controller board 300 of the projector 15c.

The projector 15c includes an application module layer at the top and a service module layer below the application module layer.

Programs that configure the software of the application module layer and the software of the service module layer are stored in the HDD 201 or the RAM of the controller board 300 and are read as required to be executed by the CPU of the controller board 300.

By executing these programs as required, the CPU implements functional parts as illustrated in FIG. 4, that is, a system control part 311, a user interface part 312, an intermediary apparatus communication function part 313, and a management apparatus communication function part 314.

The system control part 311 manages control of the entire projector 15c, and executes the process of a task execution procedure that executes a communication task using the intermediary apparatus communication function part 313 or the management apparatus communication function part 314.

The system control part 311 executes the process of a power supply control procedure that stops power supply by the power supply unit 207 when the user interface part 312 receives an operation to turn off the apparatus (the projector 15c) from the operations panel 205.

The system control part 311 requests each of the intermediary apparatus communication function part 313 and the management apparatus communication function part 314 to transmit a message. The intermediary apparatus communication function part 313 and the management apparatus communication function part 314 interpret respective received messages and perform control in accordance with the contents of the received messages.

As a result of execution of this communication task, the machine type and number information, the customer information, and the usage information of the projector 15c are transmitted to the management apparatus 102. The usage information of the projector 15c includes, for example, the following information:

a lamp operating time and a projector projection time;

a lamp lighting time in an "eco" (power saving) mode and an apparatus usage time in the "eco" mode; and the amount of $CO_2$ (carbon dioxide) reduction that indicates a value obtained by subtracting the $CO_2$ output of the "eco" mode time from the $CO_2$ output of the normal mode time.

The machine type and number information, the customer information, and the usage information may be transmitted from the apparatuses either at a preset time or periodically (for example, every day or every week).

Figure 5:
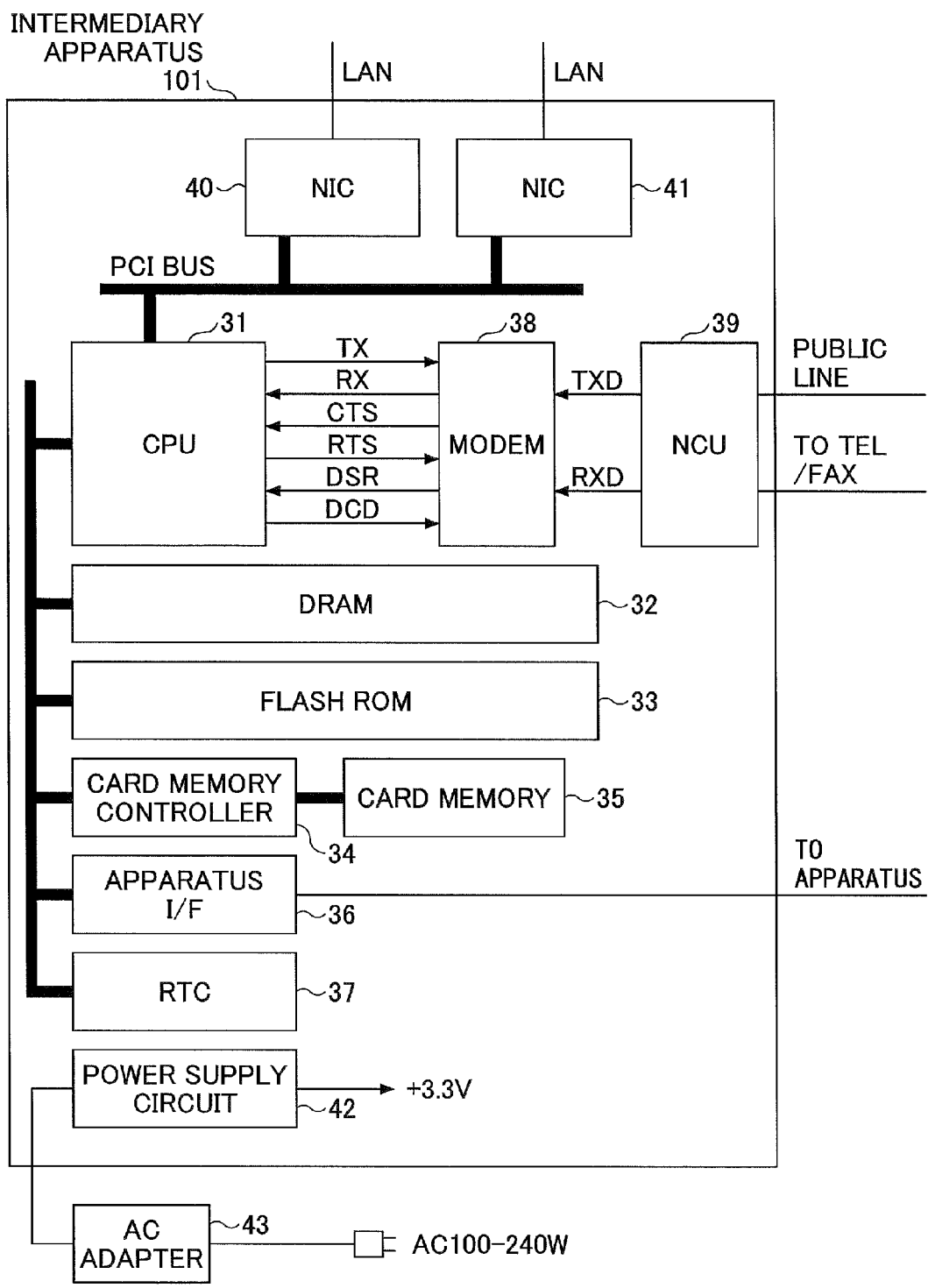
FIG. 5 is a block diagram illustrating a configuration of an intermediary apparatus according to an embodiment.

Next, a description is given, with reference to FIG. 5 as well as FIG. 1, of the intermediary apparatus 101. FIG. 5 is a block diagram illustrating a configuration of the intermediary apparatus 101.

The intermediary apparatus 101 includes a CPU 31, a dynamic RAM (DRAM) 32, a flash ROM 33, a card memory controller 34, a card memory 35, an apparatus interface (I/F) 36, a real-time clock (RTC) circuit 37, a modem 38, a network control unit (NCU) 39, network interface cards (NICs) 40 and 41, and a power supply circuit 42.

The CPU 31 controls apparatuses (for example, the MFP 15b and the projector 15c) connected to the intermediary apparatus 101 based on various programs including an operating system (OS) in the DRAM 32.

The CPU 31 controls data (signal) transmission to and data (signal) reception from the management apparatus 102 via the public line 103 or the Internet 112 through the NCU 39 or the NICs 40 and 41.

The CPU 31 calls the management apparatus 102 via the public line 103 based on data from apparatuses, and controls switching of the destination of line connection, that is, determines whether to connect a line to the apparatus side or to the external communications apparatus (fixed-line telephone (TEL) or facsimile machine (FAX)) side. The CPU 31 performs overall control of the entire intermediary apparatus 101.

The DRAM 32 is a main memory used as a program memory that stores various programs including the OS and as a work memory that the CPU 31 uses when processing data. The DRAM 32 may be replaced with a static RAM (SRAM).

The flash ROM 33 is a nonvolatile memory used as a program memory that stores a boot program and as a database (DB) that stores data transmitted between the management apparatus 102 and apparatuses (for example, the MFP 15b and the projector 15c). The flash ROM 33 is configured to retain stored data even when the intermediary apparatus 101 is turned off. The flash ROM 33 may be replaced with another nonvolatile memory such as an EEPROM.

The card memory controller 34 controls the writing of data to and the reading of data from the card memory 35.

The card memory 35, which is a recording medium such as an SD memory, stores various programs such as the OS, drivers, and applications. These programs may alternatively be stored in the flash ROM 33 or in a separately provided HDD.

The apparatus I/F 36 is an apparatus connecting part that connects apparatuses that are objects of remote management (for example, the MFP 15b and the projector 15c) to the intermediary apparatus 101.

The RTC circuit 37 generates time information. The CPU 31 determines a current time by reading the time information generated by the RTC circuit 37.

The modem 38 is a modulation and demodulation part. In the case of transmitting data to the management apparatus 102 via the public line 103, the modem 38 modulates (converts) the data into a form that is transmittable through the public line 103. In the case of receiving modulated data transmitted from the management apparatus 102, the modem 38 demodulates the received data.

The NCU 30 controls communications with external apparatuses including the management apparatus 102 or external communications devices via the public line 103.

The NICs 40 and 41 control communications with apparatuses subjected to remote management, the firewall 104, or other electronic devices including a management terminal using a personal computer (not graphically illustrated) on a LAN (or other networks).

The NICs 40 and 41 control communications with various external apparatuses including the management apparatus 102 via the firewall 104 and the Internet 112.

The power supply circuit 42 converts alternating current (AC) electric power (commercial power supply) from an AC adapter 43 into direct current (DC) electric power, and supplies the DC electric power to the above-described components of the intermediary apparatus 101.

The modem 38 and the CPU 31 are connected by a transmission data line (TX) and a reception data line (RX), which are data lines, and a clear to send (CTS) signal line, a request to send (RTS) signal line, a data set ready (DSR) signal line, and a data carrier detect (DOD) signal line, which are signal lines. The modem 38 is controlled in accordance with the RTS signal and the DCD signal from the CPU 31.

The NCU 39 and the modem 38 are connected by a reception data (RXD) signal line and a transmission data (TXD) signal line. The reception (received) data (RXD) is an analog modulated signal generated by the modem of the management apparatus 102. The transmission data (to be transmitted) (TXD) is an analog modulated signal generated by the modem 38.

This intermediary apparatus 101 transmits the machine type and number information, the customer information, and the usage information transmitted from apparatuses to the management apparatus 102.

Figure 6:
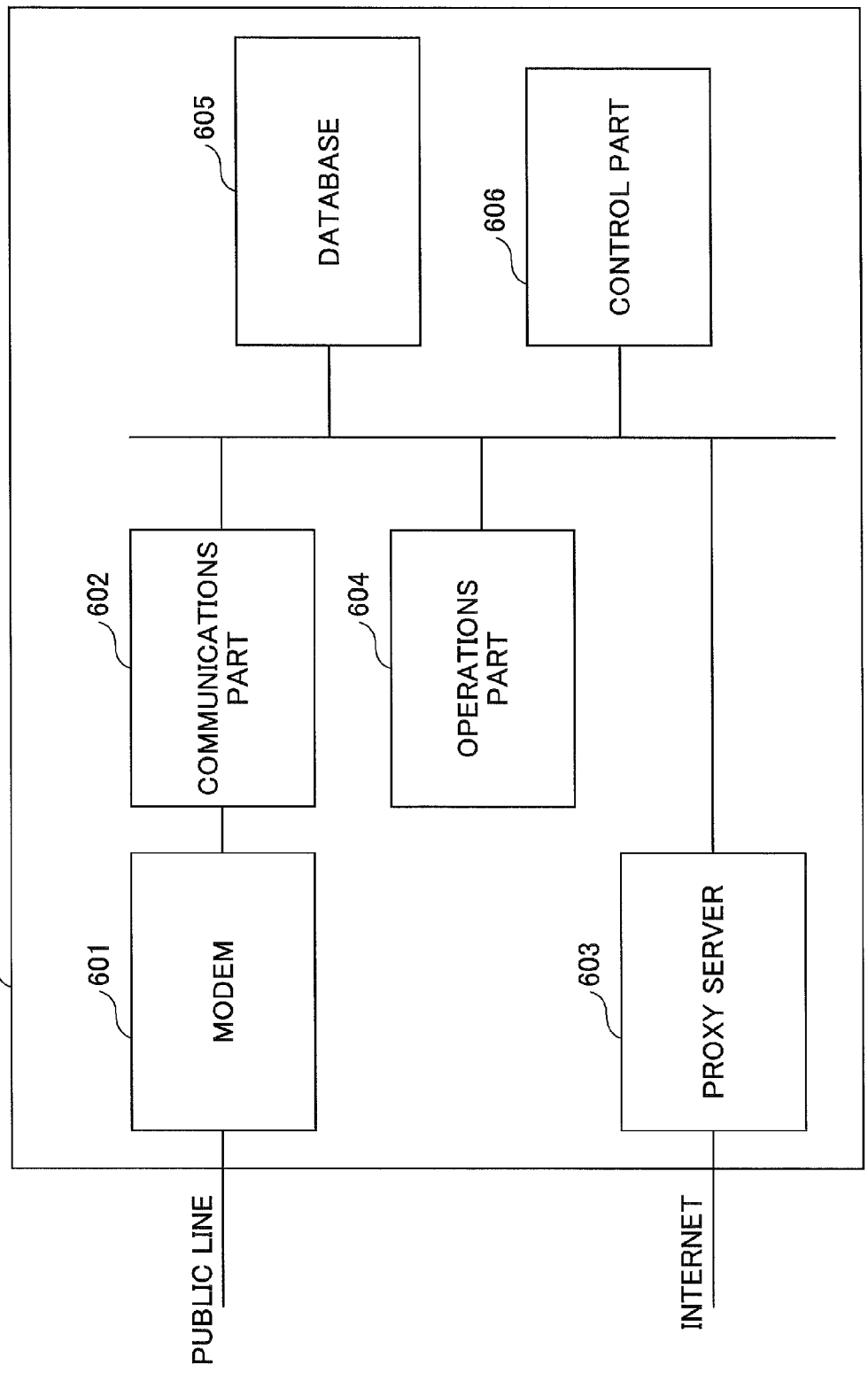
FIG. 6 is a block diagram illustrating a configuration of a management apparatus according to an embodiment.

Next, a description is given of a configuration of the management apparatus 102. FIG. 6 is a block diagram illustrating a configuration of the management apparatus 102.

The management apparatus 102 includes a modem 601, a communications part 602, a proxy server 603, an operations part 604, a database 605, and a control part 606.

The modem 601 communicates with the intermediary apparatus 101 on the apparatus side (for example, on the side of a customer who uses the projector 15c) or apparatuses via the public line 103, and modulates transmission data (to be transmitted) and demodulates received data. The communications part 602 controls communications by the modem 601.

The proxy server 603 communicates with the intermediary apparatus 101 on the apparatus side or apparatuses via the Internet 112 and performs security management.

The operations part 604 receives the input of various data through operations of an input part such as a keyboard or a pointing device (a mouse or the like) by an operator.

The database 605 resides in a storage device such as a hard disk drive, and stores data received from the intermediary apparatus 101 on the apparatus side or apparatuses and various data received from apparatuses via the intermediary apparatus 101. Examples of data stored in the database 605 include the machine type and number information, the customer information, and the usage information of apparatuses. The database 605 corresponds to the database 121 illustrated in FIG. 2.

The control part 606 includes a microcomputer including a CPU, a ROM, and a RAM, and performs overall control of the entire management apparatus 102.

The CPU operates in accordance with a program and selectively uses the modem 601, the communications part 602, or the proxy server 603, so that various functions are implemented.

Figure 7:
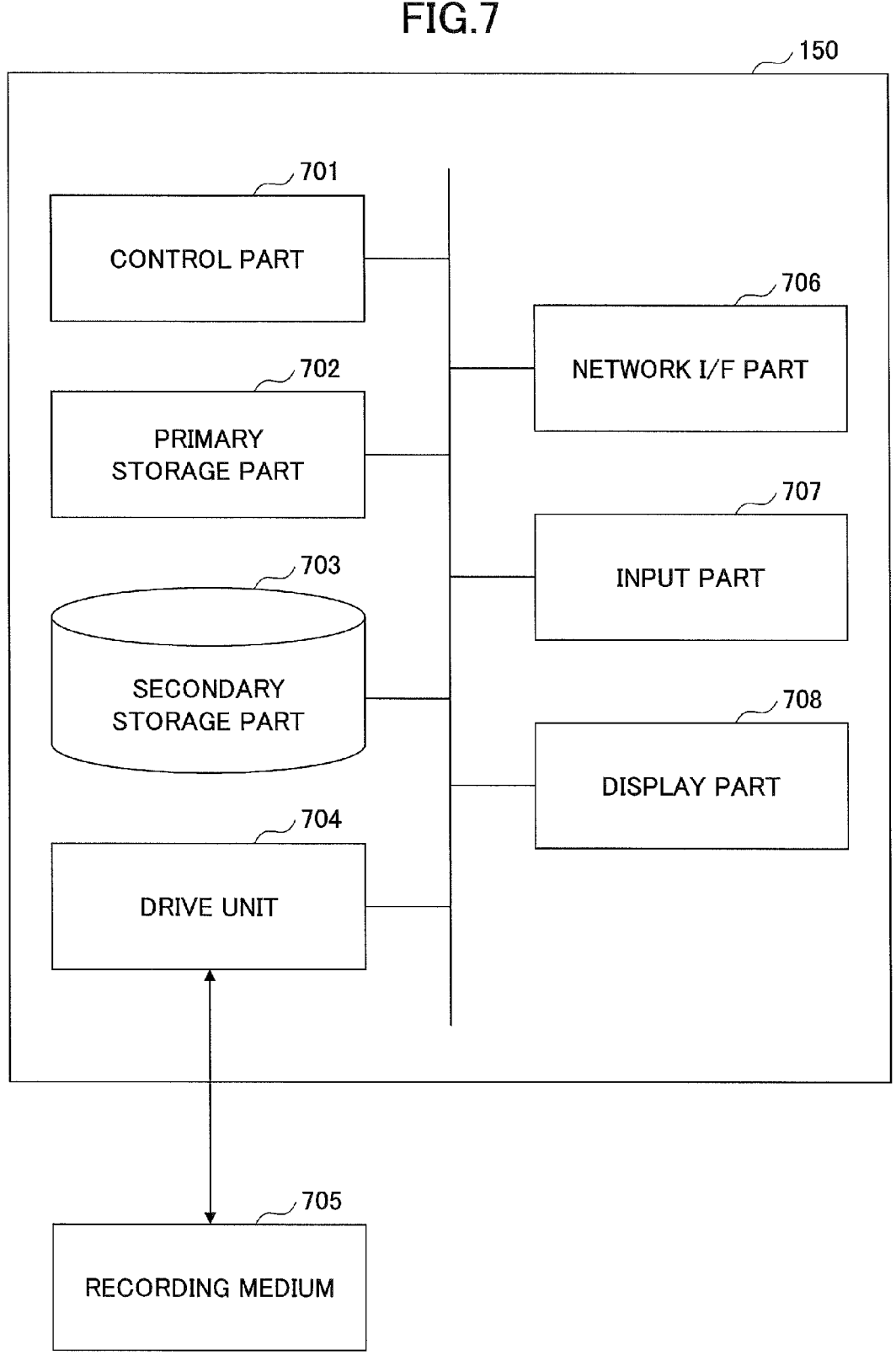
FIG. 7 is a block diagram illustrating a configuration of a creation apparatus according to an embodiment.

Next, a description is given of a configuration of the creation apparatus (a report creating apparatus) 150. FIG. 7 is a block diagram illustrating a configuration of the creation apparatus 150. The creation apparatus 150 is an information processor such as a PC or a server that creates reports.

The creation apparatus 150 illustrated in FIG. 7 includes a control part 701, a primary storage part 702, a secondary storage part 703, a drive unit 704, a network I/F part 706, an input part 707, and a display part 708, which are so interconnected by a bus as to be able to transmit data to and receive data from one another.

The control part 701 is a CPU that controls devices and performs data operations and data processing in the computer. Further, the control part 701 is a processor that executes a report creating program stored in the primary storage part 702 or the secondary storage part 703. The control part 701 receives data from the input part 707 or a storage device (the primary storage part 702 or the secondary storage part 703), performs operations on and processes the received data, and outputs the data to the display part 708 or the storage device.

The primary storage device 702, which includes a ROM and a RAM, is a storage device that stores or temporarily retains programs such as an OS, which is basic software executed by the control part 701, and application software, and data.

The secondary storage part 703, which is, for example, an HDD, is a storage device that stores data related to application software.

The drive unit 704 reads a program from a recording medium 705 such as an SD card, and installs the read program in the storage device. Further, the report creating program may be stored in the recording medium 705 and installed in the creation apparatus 150 via the drive unit 704. The installed report creating program is ready to be executed by the creation apparatus 105.

The network I/F part 706 is an interface between the creation apparatus 150 and peripheral devices having a communicating function, which are connected to the creation apparatus 150 via a network such as a LAN or a WAN constructed of a data transmission channel such as a wire circuit and/or a wireless circuit.

The input part 707 includes a keyboard including cursor keys, number input keys, and various function keys, and a mouse or a touchpad for selecting a key on the display screen of the display part 708.

The display part 708 includes an LCD and performs display in accordance with display data input from the control part 701.

Next, a description is given of functional parts implemented by processing inside the control part 701 of the creation apparatus 150. The creation apparatus 150 includes an application module layer at the top and a service module layer below the application module layer.

Programs that configure the software of the application module layer and the software of the service module layer are stored in the secondary storage part 703 or the primary storage part 702 and are read as required to be executed by the control part 701.

Figure 8:
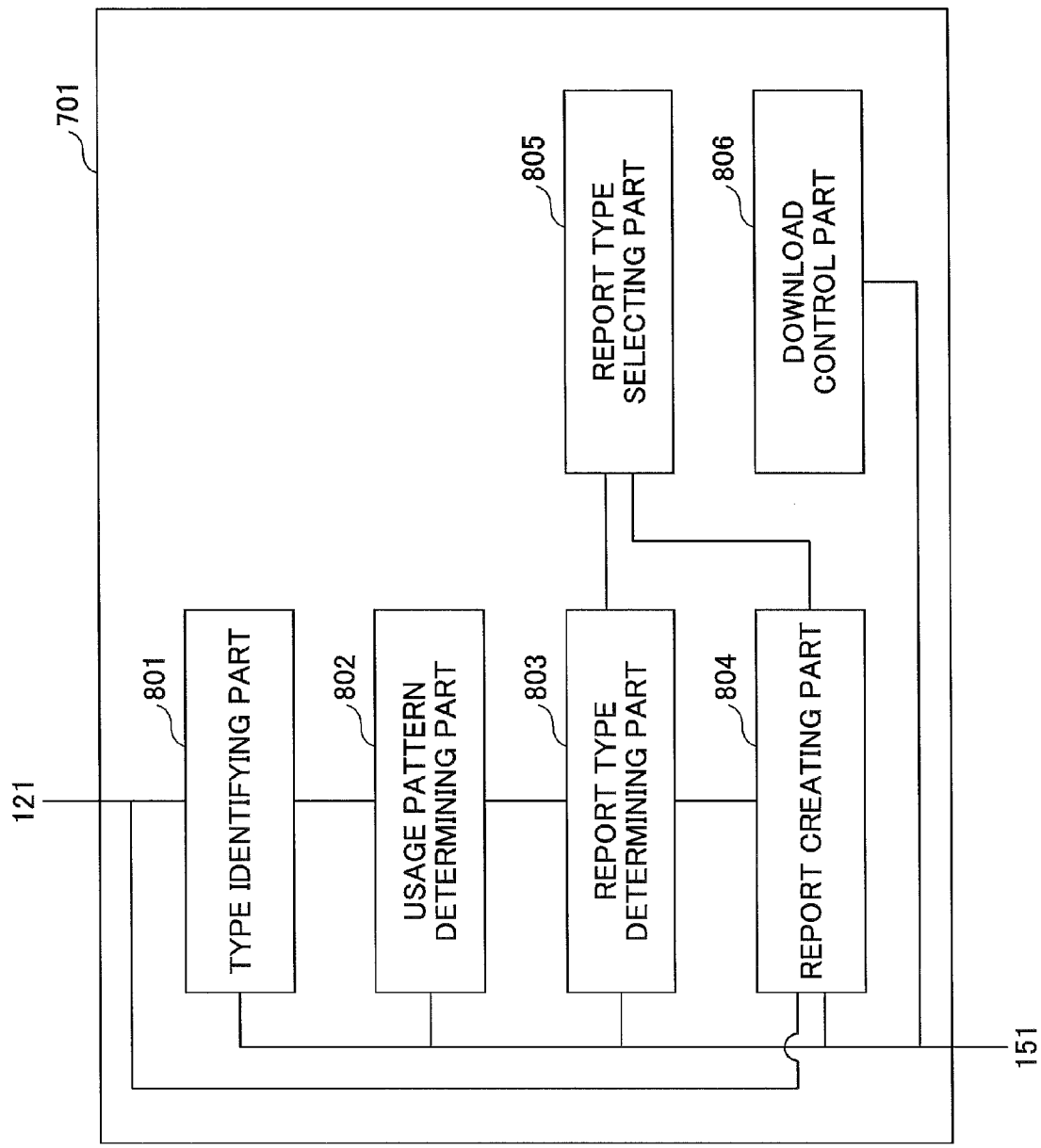
FIG. 8 is a block diagram illustrating functions of the creation apparatus according to an embodiment.

By executing these programs as required, the control part 701 implements the functional parts as illustrated in FIG. 8. FIG. 8 is a block diagram illustrating functions of the creation apparatus 150. In the case illustrated in FIG. 8, the creation apparatus 150 includes a type identifying part 801, a usage pattern determining part (a first determination part) 802, a report type determining part (a second determination part) 803, a report creating part 804, a report selecting part 805, and a download control part 806.

The type identifying part 801 accesses the database 121 (FIG. 2) of the remote management system 1, and obtains machine type and number information that includes the machine type code of one or more apparatuses. Therefore, the type identifying part 801 also operates as an obtaining part that obtains machine type and number information. Further, the type identifying part 801 accesses the database 151 (FIG. 2), and obtains machine type information that correlates the machine type codes of apparatuses with corresponding machine types.

The type identifying part 801 identifies (determines) the type of each apparatus (apparatus type) based on the obtained machine type code and machine type information. The apparatus type is, for example, an MFP, a projector or the like. The identified apparatus type indicates the type of the apparatus used by a customer.

Further, in the case of creating a report of a predetermined customer, the type identifying part 801 obtains all machine type and number information items corresponding to the customer code of the predetermined customer from the database 121. This enables the types of customer-used apparatuses to be identified on a customer basis.

The type identifying part 801 may retain customer codes in advance or obtain customer codes from customers using the PC 152 (FIG. 2). The type identifying part 801 notifies the usage pattern determining part 802 of the identified apparatus types.

In response to obtaining the apparatus types identified by the type identifying part 801, the usage pattern determining part 802 obtains pattern information from the database 151. The pattern information shows the usage pattern of apparatuses based on the presence or absence of usage. The usage pattern is a combination (of apparatus usage) showing which type of apparatus is used and which type of apparatus is not used.

The usage pattern determining part 802 determines (identifies) usage pattern based on the apparatus types identified by the type identifying part 801 and the pattern information. The usage pattern determining part 802 notifies the report type determining part 803 of the determined usage pattern.

In response to obtaining the usage pattern determined by the usage pattern determining part 802, the report type determining part 803 obtains type information from the database 151. The type information correlates usage patterns with corresponding report types.

The report type is a set of rules such as data to be used for a report, data to be presented in a report, a method of arranging, a method of aggregating, and a method of processing data handled by a report, and the format of a report. That is, the report type shows the contents of a report. The database 151 stores such rules for each report type.

The report type determining part 803 determines (identifies) a report type based on the usage pattern determined by the usage pattern determining part 802 and the type information. The report type determining part 803 notifies the report creating part 804 of the determined report type.

When determining multiple report types, the report type determining part 803 notifies the report type selecting part 805 of the multiple report types.

In the case of obtaining multiple report types from the report type determining part 803, the report type selecting part 805 displays a screen for selecting a report type (a report type selecting screen) using a user interface, and has a customer select one or more of the report types. The report type selecting part 805 notifies the report creating part 804 of the report type(s) selected by the customer. The report type determining part 803 and the report type selecting part 805 may be a single configuration.

In response to obtaining the report type determined by the report type determining part 803 or the report type selected by the report type selecting part 805, the report creating part 804 obtains rules corresponding to the report type from the database 151.

The report creating part 804 obtains data used in the rules corresponding to the report type from the database 121 of the remote management system 1. When a customer code is present, the report creating part 804 obtains necessary data from usage information corresponding to the customer code. The usage information shows the usage of apparatuses.

The report creating part 804 creates a report based on the data obtained from the usage information and the arranging method, the aggregating method, and the processing method defined in the report type. This report is, for example, a usage report according to the types of the apparatuses used by a predetermined customer. As a result, it is possible to create a usage report according to the types of the apparatuses used by a customer on a customer basis.

The report creating part 804 correlates the created report with the customer code and stores the report in correlation with the customer code. This makes it possible to manage reports on a customer basis in the database 151.

Further, the report creating part 804 may create reports at predetermined times based on a scheduling function. In this case, by causing the type identifying part 801 to obtain device information at predetermined times, it is possible to create reports at predetermined times.

Further, the type identifying part 801 obtains data from the database 121 of the remote management system 1. However, if a storage device that retains data in the database 121 is provided separately from the remote management system 1, the type identifying part 801 may also obtain data from the storage device.

It is preferable, however, that the report creating system 2 cooperate with the remote management system 1 so that the type identifying part 801 may obtain data from the database 121.

In response to receiving a report downloading request from an apparatus connected via a network (for example, the PC 152 or the PC 15*a* in FIG. 2), the download control part 806 controls execution of downloading. Further, the download control part 806 may periodically cause customers to download reports.

When a report is downloaded, the download control part 806 stores a download history (record) in the database 151. The download history includes the customer code of a customer who has downloaded the report, the downloaded report, the identification information of the downloaded report, and the date and time of downloading. As a result, it is possible to manage download histories in the database 151. The storage device that manages download histories does not always have to be the database 151.

Next, a description is given of data used in an embodiment. FIG. 9 is a diagram illustrating device information managed in the database 121 of the remote management system 1. The device information correlates customer codes and machine type and number information.

For example, machine type and number information "A284, 111111" is correlated with a customer code "456001." In the machine type and number information, information is segmented by a comma (",") and the information before the comma indicates a machine type code and the information after the comma indicates machine number information.

In the remote management system 1, the information illustrated in FIG. 9 is transmitted from apparatuses subjected to remote management (for example, the MFP 15*b* and the projector 15*c* illustrated in FIG. 2) and managed in the database 121.

FIG. 10 is a diagram illustrating machine type information managed in the database 151 of the report creating system 2. The machine type information correlates machine type codes, machine type names, and the types of apparatuses (machine types). The machine type names may be omitted from the machine type information.

For example, a machine type name "MP C4500" and a type "MFP" are correlated with a machine type code "A284." The information illustrated in FIG. 10 is registered with (recorded in) the database 151 in advance.

FIG. 11 is a diagram illustrating pattern information managed in the database 151 of the report creating system 2. The pattern information correlates usage patterns and the presence or absence of the types of apparatuses. It is assumed that the types of apparatuses illustrated in FIG. 11 are, for example, an MFP and a projector.

For example, a usage pattern "101" shows a cross ("x") for the MFP and a circle ("o") for the projector. Here, "x" indicates the absence of usage, and "o" indicates the presence of usage. That is, the usage pattern "101" indicates that the projector is used and the MFP is not used and that the used projector is managed by the remote management system 1.

FIG. 12A is a diagram illustrating an example of the type information managed in the database 151 of the report creating system 2. The type information correlates usage patterns and report types. For example, a report type "Type A" is correlated with the usage pattern "101."

In "Type A," corresponding data to be used for a report, corresponding data to be presented in a report, a corresponding method of arranging, a corresponding method of aggregating, and a corresponding method of processing data handled by a report, and a corresponding format of a report are defined.

FIG. 12B is a diagram illustrating another example of the type information managed in the database 151 of the report creating system 2. In the case illustrated in FIG. 12B, multiple report types are correlated with a signal usage pattern.

For example, three report types of "Type A," "Type D," and "Type E" are correlated with the usage pattern "101." In this case, one or more of the report types may be selected by the report type selecting part 805.

The type information illustrated in FIG. 12A or the type information illustrated in FIG. 12B may be stored in the database 151 as type information. The details of the rules of report types are stored in the database 151.

Next, a description is given of a report type selecting screen. FIG. 13 is a diagram illustrating an example of the report type selecting screen. When there are multiple report types corresponding to a usage pattern, the selecting screen as illustrated in FIG. 13 is displayed and controlled by the report type selecting part 805.

A customer checks one report type and depresses an OK button on the selecting screen as illustrated in FIG. 13. In response to detecting the selection of the checked report type, the report type selecting part 805 notifies the report creating part 804 of the checked report type.

When "Details" is selected on the selecting screen illustrated in FIG. 13, the rules defined by the report type are displayed. This allows the customer to select a report type after confirming the details of the report types.

Next, a description is given of a report created in accordance with a report type. FIG. 14, FIG. 15, and FIG. 16 illustrates reports in the case where the usage pattern indicates the use of the MFP alone. FIG. 17 illustrates a report in the case where the usage pattern indicates the use of the projector alone. FIG. 18 illustrates a report in the case where the usage pattern indicates the use of the MFP and the projector. By way of example, the reports illustrated below are usage reports.

FIG. 14 is a diagram illustrating a report based on a report type for reporting the usage of a duplex function and a combining function. In the case illustrated in FIG. 14, a report that contains a machine number, an installation section name, a data obtaining date, a total output number, duplex-related data, and combining-related data on a machine type name basis is created by the report creating part 804.

FIG. 15 is a diagram illustrating a report based on a report type for reporting output on a color mode basis. In the case illustrated in FIG. 15, a report that contains a machine number, an installation section name, a data obtaining date, and output data by color mode on a machine type name basis is created by the report creating part 804.

FIG. 16 is a diagram illustrating a report based on a report type for reporting time by operating condition. In the case illustrated in FIG. 16, a report that contains a machine number, an installation section name, and time (minutes) data by operating condition on a machine type name basis is created by the report creating part 804.

FIG. 17 is a diagram illustrating a report based on a report type for reporting the mode-by-mode projection time of a projector. In the case illustrated in FIG. 17, a report that contains a machine number, a data obtaining date, and projection time data is created by the report creating part 804.

FIG. 18 is a diagram illustrating a report based on a report type for reporting the usage of the MFP and the projector. In the case illustrated in FIG. 18, a report that contains a monthly total output number on an MFP machine type name basis and a monthly projection time on a projector machine type name basis is created by the report creating part 804.

While the above-described reports are in a table format, reports may be created using graphs and diagrams.

According to this embodiment, it is possible to create a report that shows the usage of the projector and a report that shows the usage of both the MFP and the projector in accordance with the usage pattern of a customer as illustrated in FIG. 17 and FIG. 18.

Figure 19:
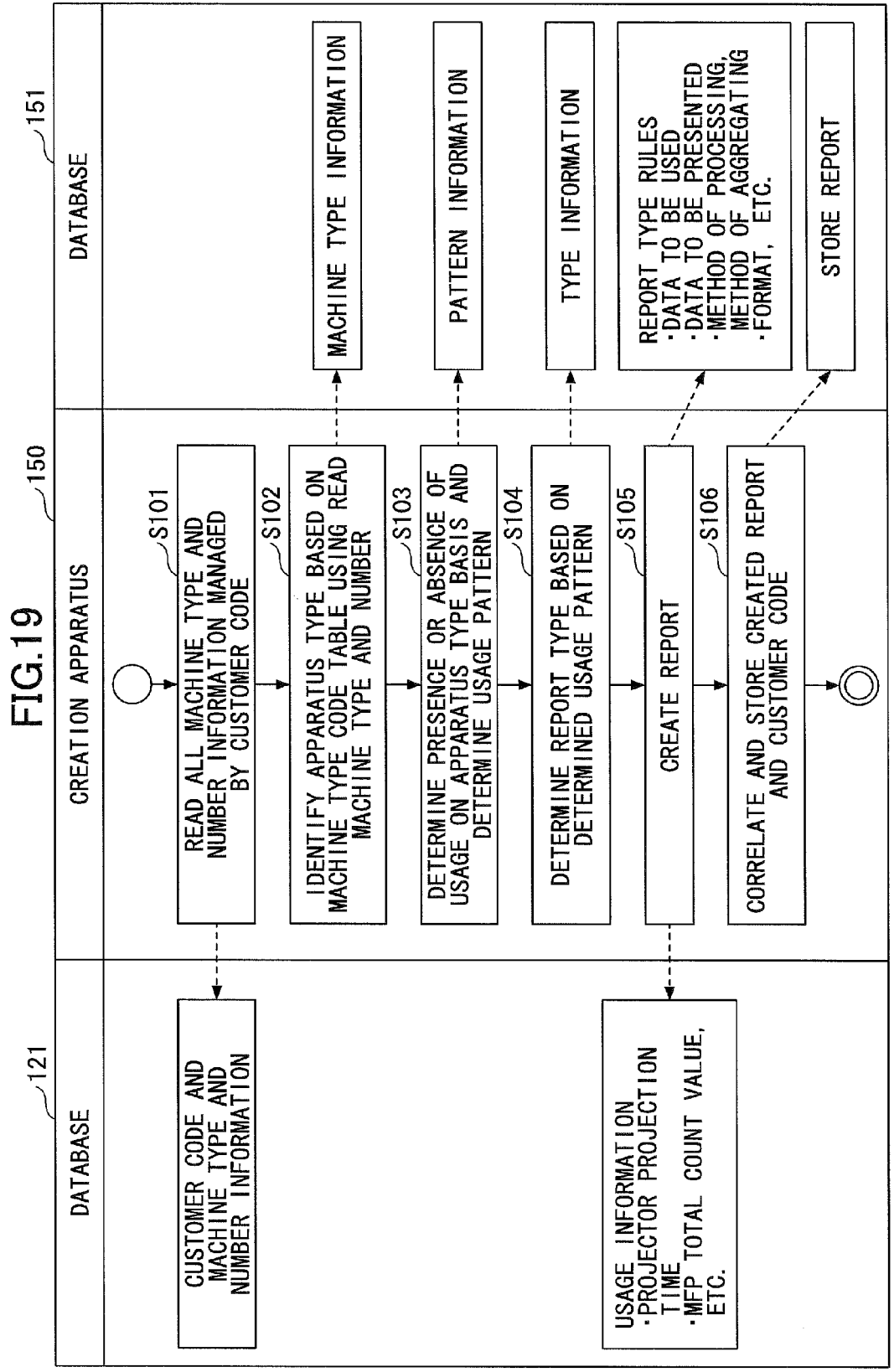
FIG. 19 is a flowchart illustrating a report creating process according to an embodiment.

Next, a description is given of a report creating procedure in the report creating system 2. FIG. 19 is a flowchart illustrating a report creating process. In the case of FIG. 19, a procedure for creating a report for a predetermined customer is illustrated. This report creating process may be automatically started periodically by a scheduling function or be started by the control of a service operation section.

Referring to FIG. 19, at step S101, the creation apparatus 150 reads all machine type and number information corresponding to the customer code of a predetermined customer from the database 121 of the remote management system. In the database 121, the machine type and number information is managed so as to allow all machine type and number information corresponding to the same customer code to be read out (FIG. 9).

At step S102, the creation apparatus 150 (the type identifying part 801) identifies the types of apparatuses by referring to the machine type information (FIG. 10) retained in the database 151 based on one or more machine type and number information items read from the database 121. The types of apparatuses are, for example, the type of apparatuses remotely managed by the remote management system 1, such as the MFP and the projector.

At step S103, the creation apparatus 150 (the usage pattern determining part 802) determines the presence or absence of usage on a machine type basis based on the identified types of apparatuses. For example, the creation apparatus 150 determines that the types of apparatuses used by this customer are both the projector and the MFP.

Because the types of apparatuses may be defined in advance, the pattern information as illustrated in FIG. 11 is pre-stored in the database 151. The creation apparatus 150 determines a usage pattern using the usage presence/absence information of the identified types and the pattern information.

The number of types of apparatuses in the pattern information is not limited and may be any number. The types of apparatuses with respect to which the presence or absence of usage is determined may be determined based on the granularity that is determined to be desirable for creating reports.

Further, consideration may be given to improvement in the efficiency of processing order, so that the process of identifying the types of apparatuses in the machine type and number information may be stopped in response to identifying a usage pattern. For example, the identifying process may be terminated when the number of the identified types of apparatuses reaches an upper limit value.

At step S104, the creation apparatus 150 (the report type determining part 803) determines a report type referring to the type information (FIG. 12A or FIG. 12B) based on the identified usage pattern.

The report type is a set of rules such as data to be used for a report, data to be presented in a report, a method of arranging, a method of aggregating, and a method of processing data handled by a report, and the format of a report. The defined rules of the report types of the type information are retained in the database 151 on a report type basis.

At step S105, the creation part 150 (the report creating part 804) creates a report using predetermined rules corresponding to the determined report type, where the rules are predetermined on a report type basis.

At this point, the creation apparatus 150 obtains usage information necessary to create a report from the remote management system 1, and processes and aggregates various data included in the usage information to create a report. The various data include the projection time of a projector and the total count (the number of outputs, for example, output sheets of paper) of an MFP.

At step S106, the creation apparatus 150 (the report creating part 804) stores the created report in the database 151 in correlation with the customer code.

This makes it possible to create various types of reports in accordance with the types of apparatuses used by a customer.

Figure 20:
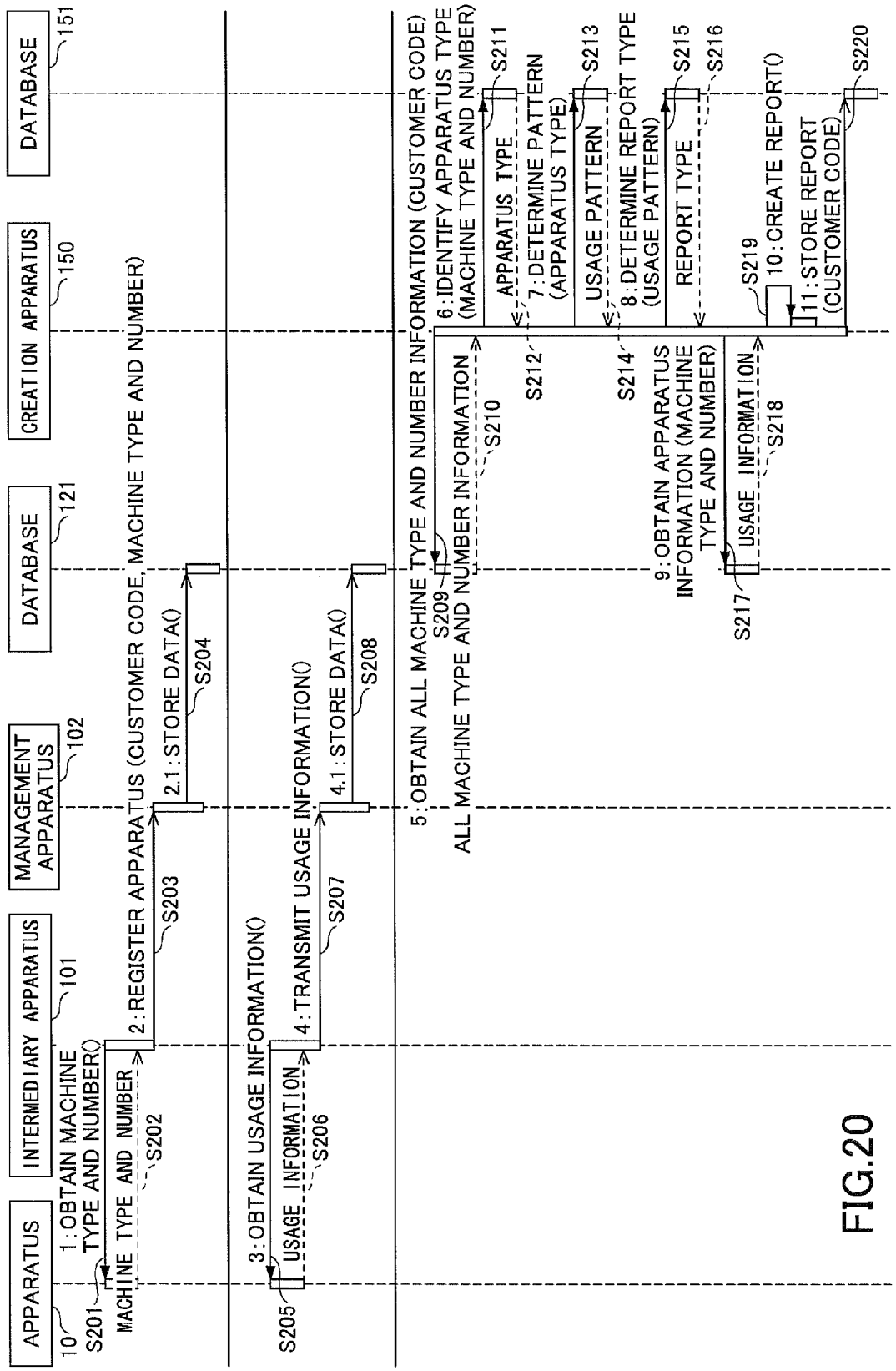
FIG. 20 is a sequence diagram illustrating a report creating process including the remote management system according to an embodiment.

Next, a description is given of a report creating procedure in a report creating system including the remote management system 1. FIG. 20 is a sequence diagram illustrating a report creating process including the remote management system 1. In the case of FIG. 20, a procedure for creating a report for a predetermined customer is illustrated. The apparatus 10 is, for example, an MFP or a projector.

At step S201, the intermediary apparatus 101 requests the apparatus 10 to obtain machine type and number information.

At step S202, in response to receiving a request to obtain machine type and number information from the intermediary apparatus 101, the apparatus 10 transmits its own machine type and number information to the intermediary apparatus 101.

At step S203, the intermediary apparatus 101 registers the apparatus 10 with the management apparatus 102. The apparatus registration includes the registration of the customer code of a customer who uses the apparatus 10 and the machine type and number information obtained from the apparatus 10.

At step S204, in response to receiving a request for apparatus registration from the intermediary apparatus 101, the management apparatus 102 correlates and stores the customer code and the machine type and number information in the database 121.

The process of steps S201 through S204 are an apparatus registration process executed in the remote management system 1.

At step S205, the intermediary apparatus 101, for example, periodically requests the apparatus 10 to obtain usage information such as counter information. When the apparatus 10 is an MFP, the usage information includes a failure notification, a supply (toner supply) notification, and the counter values of a copier and a printer. When the apparatus 10 is a projector, the usage information includes a failure notification and the projection time of the projector.

At step S206, in response to receiving a request to obtain usage information, the apparatus 10 transmits usage information to the intermediary apparatus 101.

At step S207, the intermediary apparatus 101 transmits the usage information to the management apparatus 102. This may be implemented by applying the counter notification function of the remote management system 1.

At step S208, in response to receiving the usage information from the intermediary apparatus 101, the management apparatus 102 stores the usage information in the database 121 in correlation with the machine type and number information of the apparatus 10.

The process of steps S206 through S208 is an information notification process executed in the remote management system 1.

At step S209, the creation apparatus 150 accesses the database 121 and requests to obtain all machine type and number information corresponding to a predetermined customer code.

At step S210, the creation apparatus 150 obtains all the requested machine type and number information from the database 121.

At steps S211 and S212, the creation apparatus 150 (the type identifying part 801) identifies the types of apparatuses by referring to the machine type information (FIG. 10) retained in the database 151 based on one or more machine type and number information items read from the database 121. The types of apparatuses are, for example, the type of apparatuses remotely managed by the remote management system 1, such as the MFP and the projector.

At steps S213 and S214, the creation apparatus 150 (the usage pattern determining part 802) determines the presence or absence of usage on a machine type basis based on the identified types of apparatuses. For example, the creation apparatus 150 determines that the types of apparatuses used by this customer are both the projector and the MFP. The creation apparatus 150 determines a usage pattern using the usage presence/absence information of the identified types and the pattern information.

At steps S215 and S216, the creation apparatus 150 (the report type determining part 803) determines a report type referring to the type information (FIG. 12A or FIG. 12B) based on the identified usage pattern.

At step S217, the creation apparatus 150 (the report creating part 804) accesses the database 121 and requests to obtain usage information based on the machine type and number information.

At step S218, the creation apparatus 150 (the report creating part 804) obtains all the requested usage information from the database 121.

At step S219, the creation apparatus 150 (the report creating part 804) creates a report using the usage information in accordance with predetermined rules corresponding to the determined report type, where the rules are predetermined on a report type basis.

At step S220, the creation apparatus 150 (the report creating part 804) stores the created report in the database 151 in correlation with the customer code.

This makes it possible to create various types of reports in accordance with the types of apparatuses used by a customer.

A description is given of two example operations of the above-described report creating system 2. First, it is assumed that a projector is introduced as an object of remote management into the apparatuses of a customer managed by the remote management system 1, all of which have been MFPs.

In this case, the customer may not be convinced by a mere theoretical explanation that the introduction and use of a projector has reduced the number of paper sheets distributed in meetings, and the reduction of paper use reduces document costs and an environmental load. Therefore, it is advantageous in terms of business to present the customer with a report that expresses this theory in numerical values as evidence.

For example, it is possible to collect "the projection time of a projector" and "the counter value of an MFP" as numerical value information using the remote management system 1. In the report creating system 2 of the above-described embodiment, it is possible to notify the customer that an increase in the projection time of the projector reduces the counter value of the MFP as a periodic report.

Further, this makes it possible to accelerate reduction of document costs and reduction of an environmental load through the optimization of an apparatus environment and a review of managerial and operational work.

A description is given of variations. The creation apparatus 150 may also be divided into a function of the type identifying part 801 as an obtaining part that obtains machine type and number information, a function of the type identifying part 801 other than the obtaining part, and a function as a creation part that integrates the usage pattern determining part 802, the report type determining part 803, and the report creating part 804.

In this case, the obtaining part obtains machine type and number information (first identification information) for identifying the types of apparatuses subjected to remote management. The creation part creates a report according to the types of apparatuses identified by the machine type and number information obtained by the obtaining part.

A program executed in the creation part 150 may be provided by way of being recorded in the recording medium 705 as illustrated in FIG. 7, which is a computer-readable recording medium such as a CD-ROM, a flexible disk (FD), a CD-R, and a digital versatile disk (DVD), as a file of an installable format or an executable format.

Further, a program executed in the creation apparatus 150 may be provided by way of being stored in a computer connected to a network such as the Internet 112 and being downloaded via the network. Further, a program executed in the creation apparatus 150 may be provided or distributed via a network such as the Internet 112.

A program executed in the creation apparatus 150 may be provided by way of being incorporated into a ROM.

A program executed in the creation apparatus 150 has a modular configuration including the above-described functional parts of, for example, FIG. 8. As an actual hardware configuration, referring to FIG. 7, the control part 701 reads a program from the primary storage part 702 or the secondary storage part 703 and executes the read program, so that one or more of the above-described functional parts are loaded into the primary storage 702 to be generated in the primary storage 702.

Further, while the reports are described above taking a usage report as an example, the reports may be any reports based on data obtained from apparatuses. Further, while the MFP and the projector are described as apparatuses subjected to remote management, any apparatuses may be subjected to remote management as long as the apparatuses are allowed to transmit information via a network.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention by, for example, suitably combining multiple elements disclosed in the above-described embodiments. For example, one or more elements may be deleted from the elements disclosed in the embodiments.

What is claimed is:

1. A report creating system, comprising:
a storage device configured to store
machine type information that correlates machine type codes of apparatuses remotely managed by a remote management system with corresponding types of the apparatuses,
pattern information that shows usage patterns each indicating presence or absence of usage with respect to each of the types of the apparatuses, and
type information that correlates the usage patterns with corresponding report types; and
a report creating apparatus that includes
a processor; and
a storage part storing a program that, when executed by the processor, causes the report creating apparatus to
obtain the machine type code of one or more of the apparatuses;
identify the type of the one or more of the apparatuses based on the machine type code and the machine type information;
determine the usage pattern based on the identified type and the pattern information;
determine the report type based on the determined usage pattern and the type information; and
create a report based on the determined report type.

2. The report creating system as claimed in claim 1, wherein the report creating apparatus is further caused to obtain the machine type code from a storage device of the remote management system, the storage device of the remote management system managing information on the remotely managed apparatuses, the information including the machine type code.

3. The report creating system as claimed in claim 2, wherein when the information including the machine type code is correlated with customer codes of customers using the apparatuses, the report creating apparatus is further caused to obtain every machine type code corresponding to a predetermined one of the customer codes, and store the created report in the storage device of the report creating system in correlation with the predetermined one of the customer codes.

4. The report creating system as claimed in claim 1,
wherein the determined usage pattern is correlated with two or more of the report types in the type information, and
wherein the report creating apparatus is further caused to determine one of the two or more of the report types selected by a user as the report type.

5. The report creating system as claimed in claim 1,
wherein the report creating apparatus is further caused to control downloading of the report to an external apparatus connected via a network, and to store a download history in the storage device of the report creating system, the download history including a customer code of a customer who downloads the report, the downloaded report, identification information of the downloaded report, and a date and time of the downloading.

6. The report creating system as claimed in claim 1, wherein the report creating apparatus is further caused to start creating the report at a predetermined time based on a scheduling function.

7. The report creating system as claimed in claim 1, wherein the report creating apparatus is further caused to obtain information used in the determined report type among information showing usage of the apparatuses remotely managed by the remote management system, and to create the report showing the usage of the remotely managed apparatuses.

8. The report creating system as claimed in claim 1,
wherein each of the usage patterns is a combination of a plurality of information items each indicating whether one of the types of the apparatuses corresponding to the information item is used or not.

9. The report creating system as claimed in claim 1,
wherein the report type defines each of:
data to be used for the report,
data to be presented in the report,
a method of arranging, aggregating and processing data handled by the report, and
a format of the report.

10. A report creating apparatus connected via a network to a remote management system remotely managing apparatuses, the report creating apparatus comprising:
a processor; and
a storage part storing a program that, when executed by the processor, causes the report creating apparatus to
obtain a machine type code of one or more of the apparatuses;
identify a type of the one or more of the apparatuses based on the machine type code and machine type information correlating the machine type code with a corresponding type of the one or more of the apparatuses;
determine a usage pattern of the one or more of the apparatuses based on the identified type of the one or more of the apparatuses and pattern information that shows usage patterns each indicating presence or absence of usage with respect to each of types of the apparatuses;
determine a report type based on the determined usage pattern and type information correlating the usage pattern with a corresponding one or more report types; and
create a report based on the determined report type.

11. The report creating apparatus as claimed in claim 10, further comprising:

an additional storage part configured to store the machine type information, the pattern information, and the type information.

12. The report creating apparatus as claimed in claim 11, wherein the report creating apparatus is further caused to obtain the machine type code from a storage device of the remote management system, the storage device managing information on the remotely managed apparatuses, the information including the machine type code.

13. The report creating apparatus as claimed in claim 12, wherein when the information including the machine type code is correlated with one or more customer codes of one or more customers using the one or more of the apparatuses, the report creating apparatus is further caused to obtain every machine type code corresponding to a predetermined one of the one or more customer codes, and store the created report in the additional storage part in correlation with the predetermined one of the one or more customer codes.

14. The report creating apparatus as claimed in claim 11,
wherein the determined usage pattern is correlated with two or more of the report types in the type information, and
wherein the report creating apparatus is further caused to determine one of the two or more of the report types selected by a user as the report type.

15. The report creating apparatus as claimed in claim 11,
wherein the report creating apparatus is further caused to control downloading of the report to an external apparatus connected via a network, and to store a download history in the additional storage part, the download history including a customer code of a customer who downloads the report, the downloaded report, identification information of the downloaded report, and a date and time of the downloading.

16. The report creating apparatus as claimed in claim 11, wherein the report creating apparatus is further caused to start creating the report at a predetermined time based on a scheduling function.

17. The report creating apparatus as claimed in claim 11, wherein the report creating apparatus is further caused to obtain information used in the determined report type among information showing usage of the apparatuses remotely managed by the remote management system, and to create the report showing the usage of the remotely managed apparatuses.

18. A report creating method, comprising the steps of:
obtaining a machine type code of one or more of apparatuses remotely managed by a remote management system, and identifying a type of the one or more of the apparatuses based on the machine type code and machine type information correlating the machine type code with a corresponding type of the one or more of the apparatuses;
determining a usage pattern of the one or more of the apparatuses based on the identified type of the one or more of the apparatuses and pattern information that shows usage patterns each indicating presence or absence of usage with respect to each of types of the apparatuses;
determining a report type based on the determined usage pattern and type information correlating the usage pattern with a corresponding one or more report types; and
creating a report based on the determined report type,
wherein the steps are executed by a computer.

19. The report creating method as claimed in claim 18, wherein the determined usage pattern is correlated with two or more of the report types in the type information, and wherein said step of determining the report type determines one of the two or more of the report types selected by a user as the report type.

20. The report creating method as claimed in claim 18, further comprising the step of:
controlling downloading of the report to an external apparatus connected via a network; and
storing a download history including a customer code of a customer who downloads the report, the downloaded report, identification information of the downloaded report, and a date and time of the downloading.

21. The report creating method as claimed in claim 18, wherein said step of creating starts creating the report at a predetermined time based on a scheduling function.

22. The report creating method as claimed in claim 18, further comprising:
obtaining information used in the determined report type among information showing usage of the apparatuses remotely managed by the remote management system, wherein said step of creating creates the report showing the usage of the remotely managed apparatuses.

* * * * *